FIG.1 ized Jan. 20, 1970

United States Patent Office 3,490,814
Patented Jan. 20, 1970

3,490,814
ELECTRICALLY CONTROLLED FLUID BRAKING SYSTEM FOR RAPID TRANSIT CARS
Robert D. Smith, Irwin, and Ronald A. Sarbach, Pittsburgh, Pa., assignors to Westinghouse Air Brake Company, Wilmerding, Pa., a corporation of Pennsylvania
Filed July 28, 1967, Ser. No. 656,929
Int. Cl. B60t 13/68, 13/70, 13/72
U.S. Cl. 303—20       18 Claims

ABSTRACT OF THE DISCLOSURE

Apparatus for exercising electrical control over the pneumatic brake unit of a rapid moving vehicle by means of and in accordance with the variable parameter of a control signal supplied from a control station which may be remote from or located within the vehicle whose brakes are to be controlled. The control signal, and particularly the instantaneous value of its variable parameter, is sensed and converted to a proportional potential, which is modified by effectiveness of dynamic braking and loading on the car. The modified potential is utilized via electrical circuitry, to control the application or release of the pneumatic brakes, or the propulsion of the vehicle, in an amount proportional to the level of this modified potential; and a feedback loop is arranged by which a further potental representative of pneumatic brake pressure is generated and employed to vary the modified potential to maintain the desired degree of braking, included no braking at all, or propulsion, if that is desired at any given moment.

BACKGROUND OF THE INVENTION

The present invention relates generally to vehicle braking systems, and more particularly to improved electrically controlled fluid brake equipment and braking systems for single or multiply-coupled rapid transit cars, to provide substantially instantaneous and equalized brake control on all cars.

In the past, numerous proposals have been advanced for systems by which to exercise electrical or electronic control over pneumatic or other fluid pressure-operated braking systems for vehicles in general, and for trains, both manned and unmanned, in particular. In one such previous system the amount of pneumatic brake dictated and called for by the conditions at hand is compared with the amount of dynamic brake available or dynamic brake effectiveness, and an error signal is derived from the comparison by which to controllably modify the extent of fluid braking on each car of the train.

While such a system is quite suitable for the intended purpose it tends to react relatively slowly to the braking called for because of the inherent nature of a comparison system in which an error signal is derived.

It is a principal object of the present invention to provide an improved electrically controlled, fluid pressure-operated brake system for rapid transit vehicles.

It is another object of the invention to provide a novel electrical and fluidic control system for a multiple-car rapid transit train by which substantially equalized and instantaneous braking control is exercised on all cars simultaneously, with the braking exerted on each individual car conditioned upon factors peculiar to that car, such as loading and dynamic brake effectiveness on the car.

SUMMARY OF THE INVENTION

Briefly, according to the present invention the brake control system may be controlled either manually or automatically in either of two modes, one of which modes is obtained by selective energization of separate "application" and "release" wires extending through the car or train of cars, and the other mode selected by energization of a brake control and vehicle propulsion wire loop circuit also extending through the cars of the train, the degree of braking control being effected in the latter mode in inverse proportion to the magnitude of current flowing through the wire loop. This current is applied to an electronic operating unit via a magnetic amplifier which also acts to isolate the wire from influence by the operating unit. The application and release wires are also isolated, but via controllable relays, relative to the operating unit. Appropriate selection of mode is accomplished by operation of a switch available on each car.

The operating unit includes control devices for sensing the degree of effectiveness of the dynamic brake and the magnitude of loading, or weight, on the car, and for generating control signals representative thereof by which to modify the brake control voltage generated by the operating unit in response to the energization of the control wire or wires for the particular mode selected. The modified brake control voltage is then utilized to selectively control the energization and de-energization of application and release magnets in valves on the pneumatic feed lines and control valving for the pneumatic brake units, in such a manner as to establish, increase, reduce, or remove pneumatic brake pressure, as indicated by the control exercised by the brake control voltage, to provide the desired braking on the car. Preferably, a pair of brake units (fluid pressure-operated) is employed on each car to provide maximum response in a minimum time interval.

The pneumatic brake pressure is sensed and converted to a representative electrical signal which is fed back to the operating unit, or a portion thereof, to maintain the desired braking control and to satisfy the pneumatic braking requirement of the car.

In essence, then, the vehicle brake control apparatus of the present invention includes a control station, a source of electrical energy for the control station, means in each car responsive to energization by the source for developing an electrical potential of magnitude representative of the extent of that energization, a brake line capable of retaining fluid under pressure for application to a fluid braking unit of the vehicle, means for supplying fluid under pressure to the brake line, means responsive to electrical signal derived from the developed electrical potential for controlling the fluid pressure supply means to divert fluid under pressure to or from the brake line in accordance with the desired degree of braking represented by that developed electrical potential, and means responsive to the fluid pressure in the brake line for generating a further electrical signal representative of that fluid pressure, by which to modify the first-mentioned electrical signal, and thereby, the control exercised by the controlling means to maintain the desired degree of braking.

BRIEF DESCRIPTION OF THE DRAWINGS

The above and still further objects, features and attendant advantages of the present invention will become apparent from a consideration of the following detailed description of a preferred embodiment thereof, especially when taken in conjunction with the accompanying drawings in which.

DESCRIPTION OF THE PREFERRED EMBODIMENT

Figure 1:
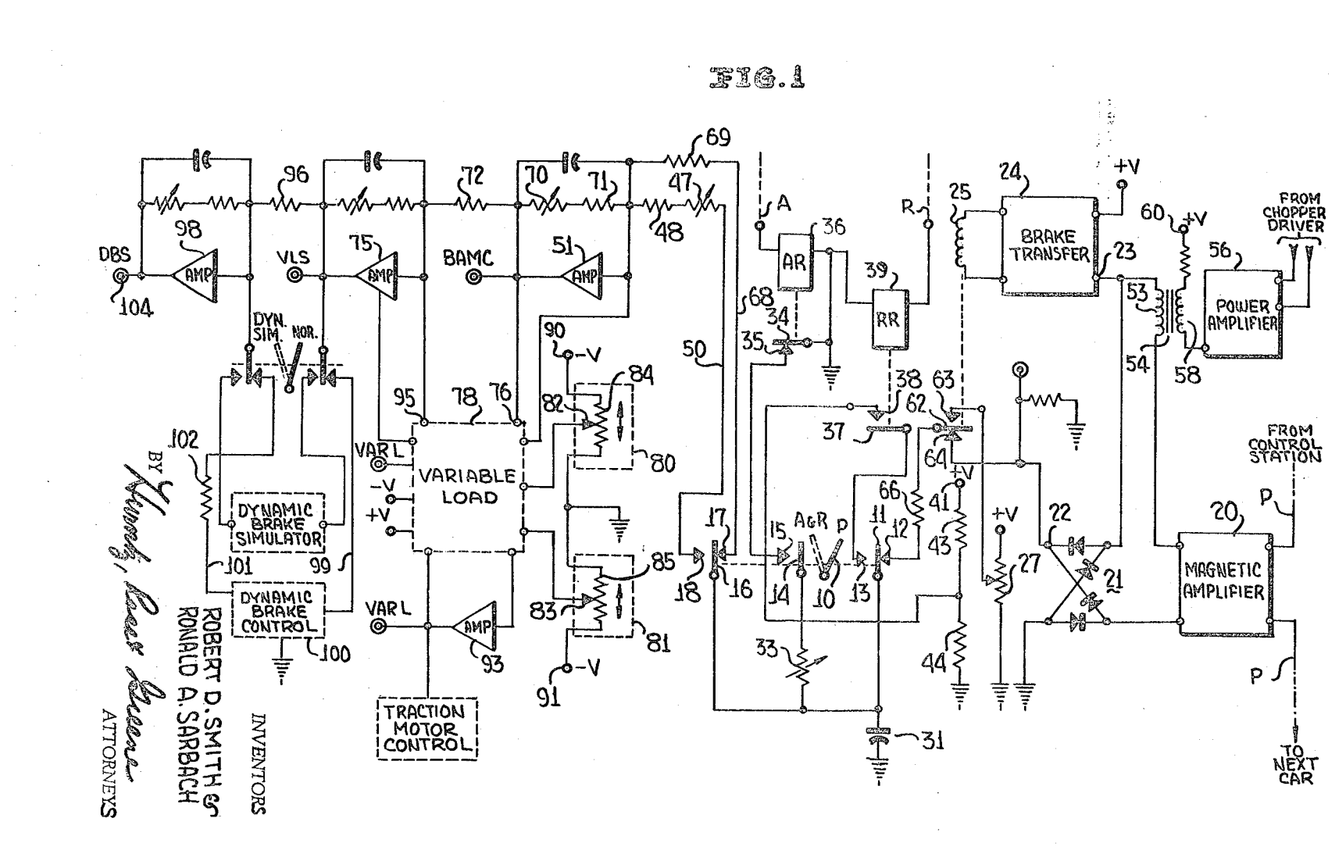
FIGURE 1 is a circuit diagram of an embodiment of the electronic operating unit of the brake control system.

Referring now to FIGURE 1, the embodiment of the electrical control operating unit there illustrated corresponds in all essential details to that disclosed by Peter Brath and ourselves in copending application for U.S. Letters Patent, bearing Ser. No. 579,386, entitled "Electrically Controlled Brake System for Railway Cars," filed Sept. 14, 1966, now Patent No. 3,398,815 and commonly assigned herewith. Accordingly, the description of the electronic control system of FIGURE 1 need only be relatively brief, and will cover only the essential elements of that system.

Each car of the train is provided with an operating unit of the type shown in FIGURE 1, the unit being arranged and adapted, as will presently be explained, to operate in either of two modes, which may be selected as desired. To this end, each operating unit is connected to an "A" wire, or "application" wire, and to an "R" wire, or "release" wire, which extend through the particular car under consideration or through the train of cars from a control station located on one of the cars, and which may be selectively energized by a source of electrical energy at the control station to effect a desired degree of application or release of the brakes, in a manner to be described in detail presently. For apparent reasons, then, this mode will hereinafter be designated the "A and R" mode of operation.

The other operating mode, hereinafter termed the "P" wire mode, is selected, as is the "A and R" mode, by means of a switch 10, and exercises its control upon the braking units of the vehicle in accordance with the magnitude of current flow in a P wire loop circuit through the car or cars of the train. While the basic control of the braking system to be described may be exercised either manually or automatically, for the sake of convenience and clarity of the present discussion, it will be assumed that manual control is to be exercised. This should not be taken as an intent to exclude or an actual exclusion of automatic control which is, in fact, both feasible and practical, and which may utilize any number of prior art arrangements of automatic means such as the velocity control programmer described in co-pending application Ser. No. 527,594, filed Feb. 15, 1966, in the name of Blanchard D. Smith, and entitled "Motion Control System for Rapid Transit Vehicles," commonly assigned herewith.

The P wire or conductor extends from the control station, which is preferably located in the lead car of the train, through the car or cars of the train whose braking is to be selectively actuated. It should be observed, of course, that the concepts and principles of the present invention are equally applicable to radio signal operation or other "non-wire" communication arrangements of conventional design, although the use of wires extending through the cars and controllably energized by an operator in the control station of the lead car is preferred. Selection of "A and R" mode or "P" mode is accomplished by appropriate actuation of switch 10, which is illustrated for the sake of simplicity and clarity in FIGURE 1 as being of conventional single-pole double-throw construction. Switch 10 may be manually operated within the confines of the particular car in question or may be remotely actuated by any of the great variety of conventional remote control systems, and the switch may further be conventionally arranged and adapted to admit of either manual or automatic actuation, the essential point being that the braking system of the cars is arranged for selective control by electronic apparatus which may be operated in either "A and R" mode or "P" mode, as desired. In the "P" mode position of switch arm 10, as shown, the armatures of three separate switches associated therewith are actuated or conditioned as follows: Armature 11 is resting against contact 12, thereby closing a circuit therebetween, armature 14 is displaced from fixed contact 15 thus maintaining an open circuit condition thereat, and armature 16 is resting against fixed contact 17 to provide a closed circuit therebetween. It will be observed that in this arrangement of switches 10, 11, 14 and 16, that the A wire and the R wire as well as apparatus associated therewith are completely isolated from the electrical control system or operating unit of the car in question and cannot, therefore, exercise any degree of control over such unit. Observe, for example, that the energization or de-energization of application relay (AR) 36 or release relay (RR) 39 and the consequent opening or closing of associated contacts 34, 35 or 37, 38, respectively, have no effect whatever on the operating unit since contact 35 of the application relay is connected to contact member 15 of switch 14, which is open, whereas switch arm 37 of release relay 39 is electrically connected to fixed contact member 13 of switch 11, which is open as to that contact.

Similarly, with switch arm 10 thrown, or closed, in the "A and R" mode, switch blade 11 breaks contact with member 12 and closes contact with member 13, switch arm 14 closes contact with member 15, and switch arm 16 breaks contact 17 and closes contact 18, whereby to isolate the P wire and associated apparatus physically and operatively from the electrical control operating unit. In this respect, it will be observed that the coupling of the P wire and associated apparatus to the electrical control unit of each car is dependent upon the maintenance of contact between a switch arm 62 and fixed contact 64 of a brake transfer relay, including relay coil 25, through the switch arm 11 so as to permit application of the output of a full wave rectifier 21 to the remainder of the electrical control operating unit. With switch arm 11 closed against fixed contact 13, any connection between the P wire and its associated apparatus and the remainder of the electrical control unit is broken, and the P wire is accordingly isolated from the control unit.

Since the operation of a control modifying unit portion of the operating unit of FIGURE 1, fed via wires or conductors 50 and 68 from switch 16 according to whether "A and R" mode or P mode operation is selected, is the same for either mode, a discussion of the control modifying circuit will be deferred pending a description of the operation of the electrical control unit for each of these modes. Assuming first a selection of the "A and R" mode by appropriate actuation of switch 10, the aforementioned arrangement of switches 11, 14, and 16 for such mode is manifested so that application relay contact 35 is connected to switch arm 14 via contact 15 and release relay armature 37 is connected to switch arm 11 via contact 13. Under normal conditions, that is, with neither the application wire nor the release wire supplied with current, neither application relay 36 nor release relay 39 is energized, and under those conditions, contacts 34, 35 of the application relay are closed and contacts 37, 38 of the release relay opened. Hence, the only paths for current are via conductor 50, closed contacts 16 and 18, and either by way of resistor 33, closed contacts 14 and 15, and closed contacts 34 and 35 back to ground potential, or via capacitor 31. While these current paths are available, there is normally no flow of current in the circuit under those conditions. It will also be observed that under these conditions, any tendency for capacitor 31 to be charged, in the event of some small transient current flow, is overcome by the existence of the leakage path to ground via resistance 33, closed contacts 14, 15 and closed contacts 34, 35.

Full service application of the brakes is accomplished in the "A and R" mode by de-energizing the windings of both AR relay 36 and RR relay 39, thereby placing contacts 34 and 35 in their normally closed position and contacts 37, 38 in their normally open position. The charging path for capacitor 31, from the voltage source connected to terminal 41 and through resistor 43, is open as a result of the open circuit between armature 37 and contact 38 of RR relay 39. A discharge path for capacitor 31 exists, however, through variable resistor 33 and closed contacts 14, 15 and 34, 35 to ground, so that the charge on the capacitor may be completely drained. The rate of this discharge may be controlled by appropriate adjustment of variable resistor 33. When the voltage across capacitor 31 reaches a value of zero, the brakes are full on, i.e., fully applied.

When a release of brakes is desired, current flow is initiated via the application (A) wire, through the windings of application relay 36 and back to ground, thereby opening switch arm 34 and contact 35. This is followed by the initiation of current flow in the release (R) wire, through the winding of release relay 39 and thence to ground, such that armature 37 is attracted into contact with fixed contact member 38. Thus, capacitor 31 is charged to a positive voltage as the result of current flow from terminal 41 (connected to a source of positive voltage), through resistor 43, closed contacts 37, 38, and 11, 13. The magnitude of the voltage to which capacitor 31 is charged is proportional to the division of voltage effected by resistors 43 and 44, and to the length of time that release relay 39 is energized. It is, of course, quite clear that these conditions are readily controllable so as to permit the storing of a voltage of predetermined magnitude on capacitor 31 as desired to be equated with a full release condition. The rate at which capacitor 31 is charged is limited, to an extent, by resistor 43 such that the capacitor is not presented with a step function voltage as the relay contacts make and brake in the foregoing operation. The voltage stored on capacitor 31 is applied to lead 50 through closed contacts 16, 18, and thence to the control modifying unit. As will presently be explained, this application of voltage to the control modification unit from capacitor 31 will result in the release of the brakes of each car on which such control is to be effected, full release being effected when capacitor 31 is fully charged to the aforementioned predetermined potential.

In the event that it is desired to provide an intermediate degree of brake application, i.e., braking of any desired degree between full application and full release, the voltage to which capacitor 31 is charged from a fully discharged condition (full application of brakes), or is discharged from a fully charged condition (full release of brakes), is appropriately controlled. If, for example, the brakes are fully released and some application of brakes short of full braking is desired, AR relay 36 and RR relay 39 are de-energized to permit the draining of charge from capacitor 31 via resistor 33 through contacts 14, 15 and 34, 35 and thence to ground. When the potential on the capacitor is at a level corresponding to the desired degree of braking, the application (A) wire is energized, thereby opening contacts 34, 35 (RR relay being maintained in a de-energized condition throughout this operation). Accordingly, capacitor 31 is isolated from a discharge path and retains a residual charge in an amount inversely proportional to the degree of braking. In other words, AR relay 36 is de-energized for a time interval, $t$, which permits the desired amount of discharge of the capacitor, and is then energized to hold the capacitor charged at that intermediate voltage. It should be apparent that any desired level of intermediate braking may also be achieved from a condition of full braking or from any other level of intermediate braking by appropriate sequence of control of AR and/or RR relays.

In the "P" mode of operation with switch arm 10 thrown to the right as viewed in FIGURE 1, switch arm 11 closes against contact 12, switch 14 is open, and switch arm 16 closes against contact 17. Control of the brakes via the P wire and of the degree of such braking is accomplished by appropriately setting the magnitude of current flowing through the P wire, by adjustment of voltage applied to the P wire from a source of electrical energy at the control station. Control of type and extent of braking in accordance with magnitude of current flowing through the P wire, is effected in the following manner.

In each electrical control operating unit, such as the one shown in FIGURE 1 of the drawing, the current flowing through the P wire is monitored by the control winding of a saturable reactor of magnetic amplifier 20. To this end, the reactor control winding is connected in series with the P wire such that the D–C current flowing through the P wire also flows through the control winding. As current through the P wire varies between predetermined limits representing full brake and full release commands (say 0 and 0.5 ampere, respectively), with proportional control therebetween, the impedance of the A–C winding and associated portion of the saturable reactor, coupled to full wave rectifier 21 via a transformer 54, varies in accordance with the saturation of the reactor core. The secondary winding 53 of transformer 54 is connected in series with the A–C windings of the saturable reactor and is coupled to power amplifier 56 through its primary winding 58, the other end of the primary winding being connected to a positive voltage source via terminal 60. The voltage on primary winding 58 and thus on secondary winding 53 to the full wave rectifier 21, is periodically varied by appropriate energization of the power amplifier from a chopper driver (not shown). In this manner, an A–C voltage in the form of a uniform square wave is supplied to rectifier 21, the amplitude of the square wave being dependent upon the impedance of the saturable reactor portion of the power circuit containing winding 53, and more particularly, upon the extent of saturation of the saturable reactor of magnetic amplifier 20. The D–C voltage output of full wave rectifier 21 between terminal 22 and ground is therefore directly proportional to the effect upon magnetic amplifier operation of the P wire current. Accordingly, as P wire current increases from zero value (full brake command, in this example) through the control winding of the magnetic amplifier, the reactance of the power winding of A–C winding thereof decreases, and the D–C output voltage of rectifier 21 increases. The output voltage of the rectifier is applied via normally closed contacts 62 and 64 of the brake transfer relay to the charge rate limiting resistor 66 to produce a current therethough, which current flows through closed contacts 11 and 12 to charge the capacitor 31. Quite clearly, the higher the output voltage of rectifier 21, the greater is the magnitude of the voltage to which capacitor 31 is charged. However, at a predetermined value of P wire current (say 0.5 ampere), the reactance of the A–C winding of magnetic amplifier 20 is such that a predetermined voltage is applied to terminal 23 of brake transfer unit 24, of sufficient magnitude to energize winding 25 thereof, and thereby pull switch arm 62 from contact 64 to contact 63. Thus, at this predetermined value of P wire current, which is hereinafter sometimes referred to as full release command and above which value is termed propulsion command, the capacitor 31 is disconnected from the output terminal of rectifier 21 and is, instead, coupled to a fixed positive voltage value (corresponding to full release voltage) appearing at the slider of potentiometer 27. This insures brake release during propulsion.

The control is such that from a zero value of D–C current through the P wire to the aforementioned predetermined value of P wire current, the brakes are controlled from a point of full application to a point of full release, respectively, with degree of braking inversely proportional to current amplitude between those values. When current through the P wire exceeds the preceeds the predetermined limit at which full brake release is manifested, the brake transfer relay winding 25 is energized to cause the "making" of relay contacts 62 and 63 following the "breaking" of contacts 62 and 64. At this point and for values of P wire current exceeding the full release command value, full charging current is applied to capacitor 31 and the unit assumes a propulsion mode which is unaffected by further increases (within a preset limit) in P wire current. During control of braking for P wire current values ranging from zero to 0.5 ampere (full release, in this example), the application of charging current via rate limiting resistor 66 insures a rate change, as opposed to a step change in the braking values, and consequently eliminates rough braking action on the vehicle. Very sudden, rough braking action would occur as a result of step function control of capacitor charging at the control point, and the rapid response of the braking system to these control requirements. It should be observed from the foregoing description that 0.5 ampere current in the P wire produces full charge on capacitor 31 which corresponds to the full release condition of the brakes, and that zero current in the P wire corresponds to zero voltage on or discharge of capacitor 31 which corresponds to full service application of the brakes. The voltage to which condenser 31 is charged is supplied via switch contacts 16, 17 through wire 68 and resistor 69 to amplifier 51 which is utilized for control of magnitude of brake application (BAMC).

As previously observed, the operation of the electrical control operating unit of the car is identical from this point to the output terminal for both the "A and R" and the "P" modes of operation.

The values of resistors 69, 70 and 71 of the brake application magnitude control unit are selected to have a relationship such that the output voltage of amplifier 51 is of the desired value to provide full brake application when the capacitor 31 is discharged to the low voltage at terminal 22 of rectifier 21 existing for a P wire current flow representing full brake command, that is, zero current. Similarly, the values of resistors 47 and 48 in relationship to the values of resistors 70 and 71 are selected to insure an output voltage from amplifier 51 which will result in exertion of full application of brakes when the operating unit is in the A and R mode and full brake command has been effected in that mode (in which discharging current is conducted from capacitor 31 to circuit ground).

The output of amplifier 51, which may be monitored at the BAMC terminal, is applied to a second amplifier 75 via resistor 72 and is concurrently applied to terminal 76 of a variable load unit 78. The preferred embodiment of a variable load unit or variable load device 78 is illustrated and described in detail in the aforementioned patent application Ser. No. 579,386, of Brath et al., which embodiment is incorporated herein by reference and need not be further discussed in this application. It is sufficient to note that variable load device 78 is employed to sense the load on the car with which it is associated and to modify the braking signal continuously in accordance therewith, so that the braking signal called for may be in terms of absolute deceleration for all car weights from fully unloaded to fully loaded condition. Overloaded cars are treated as fully loaded. The equipment associated with variable load device 78 includes a pair of potentiometer-type load sensing cells designated 80 and 81, which are, in effect, pressure to electric transducers, one at each end of the car. The contactors or sliders 82 and 83 of potentiometer resistors 84 and 85, respectively, provide a negative voltage from the respective voltage terminals 90, 91 via appropriate elements of the variable loading device 78 to amplifier 93 as an average load reading. The output of amplifier 93 is applied to other components of the variable load device 78, as fully described in the aforementioned application of Brath et al., to establish an appropriate voltage representative or indicative of the load on the vehicle, which load-representative voltage is applied from terminal 95 of the variable load unit to the input of amplifier 75 to modify the applied voltage from amplifier 51 according to vehicle load.

The output of amplifier 75, which may be monitored at the terminal designated VLS, is supplied via resistor 96 and via a dynamic brake switch or relay having its switch arm in the "NORM" position, through wire 99, dynamic brake control unit 100, wire 101, resistor 102 and back through a second portion of the dynamic brake switch or relay, to the input terminal of amplifier 98. The structure and operation of the dynamic brake simulator and dynamic brake control units is described in detail in the aforementioned Brath et al. application, and need not be further discussed here. It is sufficient to note that the output of the dynamic brake control unit 100 is a voltage proportional to dynamic brake effort and is employed to modify the voltage supplied to the input terminal of amplifier 98 via resistor 96 from amplifier 75, in accordance with such dynamic brake effort and effectiveness.

In summary then, the output of amplifier 98 is in the form of a voltage which is supplied to DBS terminal 104 and which is representative of or bears a relation to the brake application desired, the load on the car, and the effectiveness of the dynamic brake to perform the degree of braking required. As the dynamic brake fades in response to decreasing car or train speed, the dynamic brake compensation or modifying voltage supplied to amplifier 98 from dynamic brake control unit 100 and associated equipment correspondingly decreases, such that the amount of pneumatic brake called for by the voltage supplied to the input of amplifier 98 via resistor 96 takes proportionate control.

Figure 2:
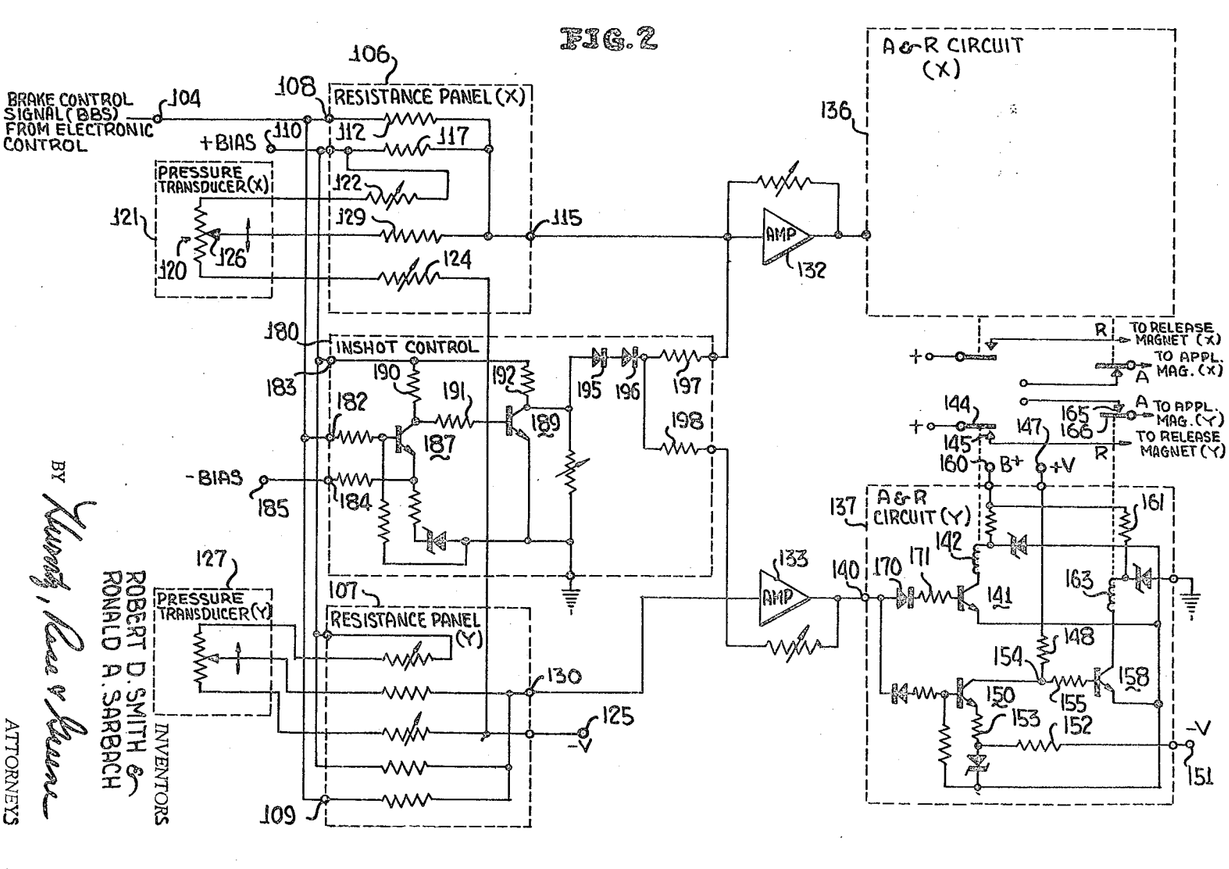
FIGURE 2 is a circuit diagram of an embodiment of a signal conversion unit for modifying the signal developed by the operating unit of FIGURE 1 to permit exercise of control on the fluid braking unit of the vehicle.

Referring now to FIGURE 2, the brake control signal appearing at terminal 104 of the electrical or electronic control operating unit of FIGURE 1 is applied to a pair of resistance panels 106 and 107 (further designated by the letters X and Y, respectively, to indicate control of or association with braking units at opposite ends of the particular car under consideration). In release operation of the equipment, the brake control signal voltage applied to terminals 108 and 109 of resistance panels 106 and 107, respectively, is a negative D-C voltage of predetermined value. A positive bias voltage is continuously supplied to terminal 110 and thence to the resistance panels 106 and 107, this bias voltage being preselected in accordance with the value of the negative voltage applied to the panels in the release operation. Referring more specifically to panel 106, the negative brake control signal voltage is supplied via the resistor 112 to an output terminal 115. Simultaneously therewith, the bias voltage appearing at terminal 110 is supplied to the same output terminal 115 of resistance panel 106 via a further resistor 117. In addition, the positive bias voltage at terminal 110 is also supplied to one end of the potentiometer 120 of a pressure-to-electric transducer 121, hereinafter sometimes referred to as a feedback transducer, via a variable resistor 122. The other end of potentiometer resistor 120 of pressure transducer 121 is connected via variable resistor 124 to a terminal 125 connected to a supply voltage of equal magnitude but opposite polarity to that of the bias voltage appearing at terminal 110. Accordingly, appropriate adjustment of variable resistors 122 and 124 and positioning of the slider of potentiometer resistor 120 can be made to result in a zero reference potential appearing at the slider. Movement of the slider contact in one direction or the other, then, in accordance with a control to be discussed more fully in a subsequent portion of the description, will result in the existence of a positive or a negative voltage thereat, depending upon the direction of movement. As will presently be clarified, the feedback transducers 121 and 127 are preferably mounted on or near the brake control valve equipment at each end of the car, as shown in FIGURE 3.

Figure 3:
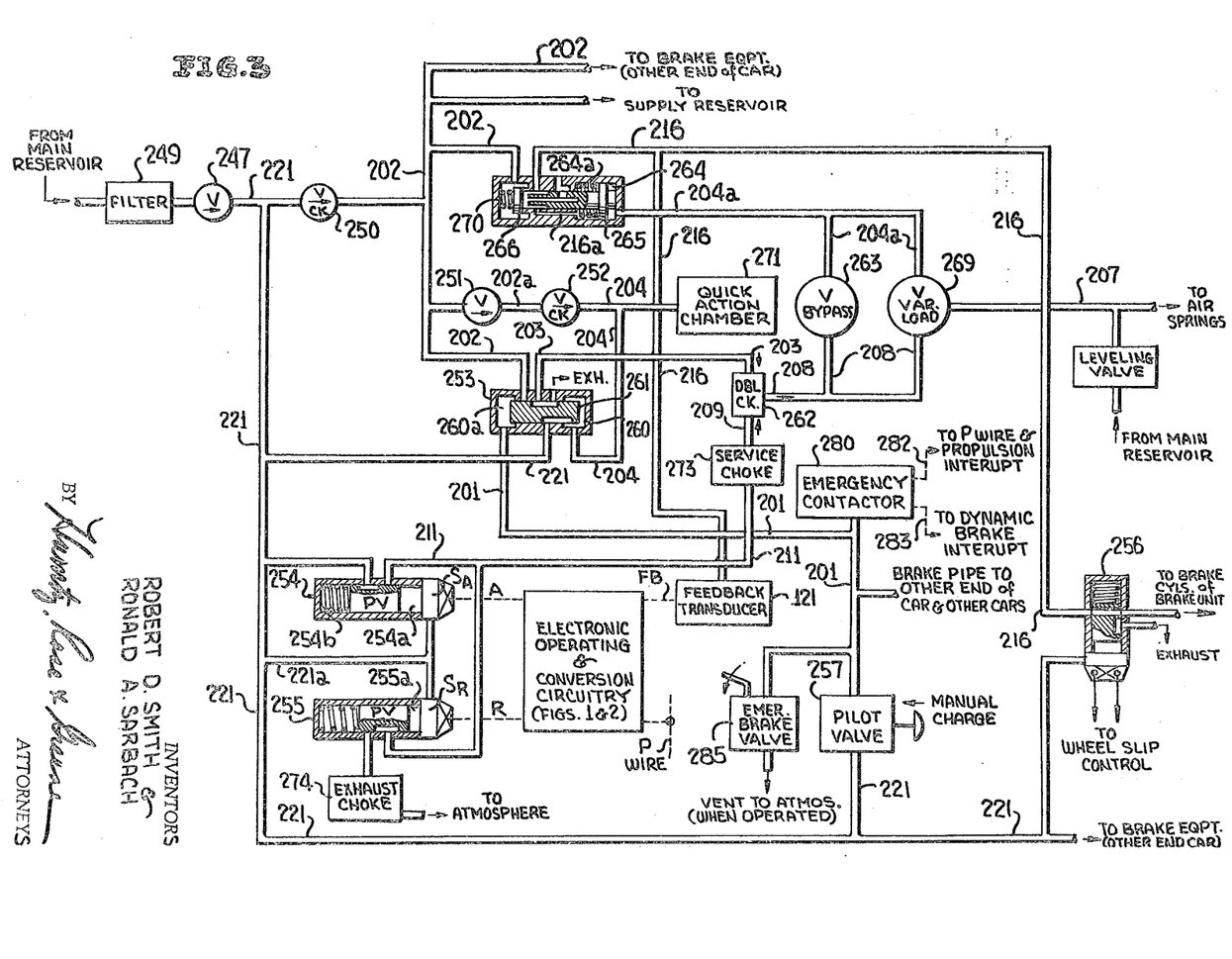
FIGURE 3 is a diagram of an embodiment of the fluid braking system for a brake unit on one end of the vehicle, in conjunction with the electronic control portion.

Deferring for the moment any further reference to FIGURE 3, and returning to FIGURE 2, contactor or slider 126 of potentiometer 120 (feedback transducer 121) moves in accordance with brake cylinder pressure supplied to a brake unit on one end of the car, while the contactor or slider of the potentiometer of feedback transducer 127 is moved in accordance with the brake cylinder pressure supplied to the brake unit on the other end of the car. As previously mentioned, to distinguish the opposite ends of the car and the equipment associated with or controlling the brake units thereat, the letter designations X and Y are employed. Variable resistors 122 and 124 are adjusted such that when the brake cylinder pressure for the brake unit at the X end of the car is zero (i.e., no brake cylinder pressure), slider 126 of potentiometer 120 provides a negative potential via resistor 129 to terminal 115 which, when added to the negative brake control signal voltage appearing at that terminal, balances the positive voltage supplied thereto from terminal 110. It will be understood, of course, that the same situation in terms of structure and operation exists for the feedback transducer 127 and resistance panel 107 at the Y end of the car. That is, under conditions at the Y end of the car corresponding to those described immediately above for the X end of the car, a zero summation voltage exists at terminal 130 of resistancem panel 107.

Accordingly, during the brake release period, no voltage is applied to amplifiers 132 and 133 via terminals 115 and 130, respectively, of the resistance panels. Each of amplifiers 132 and 133 is a D-C amplifier provided with adjustable negative feedback for high stability, and is similarly in all other respects completely conventional. Any output voltage of amplifier 132 is supplied to an application and release circuit 136 for control of the pneumatic brake unit or units at the X end of the car, while the output voltage of amplifier 133 is supplied to an A and R circuit 137 for control of the pneumatic brake unit or units at the Y or opposite end of the car. Since both A and R circuits 136 and 137 are identical in all respects, only the basic internal elements of circuit 137 have been shown, for the sake of simplicity.

In the illustrated embodiment each of amplifiers 132 and 133 produces polarity inversion between its respective input and output terminals. With zero output voltage appearing at terminal 130 and resistance panel 107, there will, of course, be a zero voltage at the terminal 140 of A and R circuit 137. Under these conditions, transistor 141 is non-conductive and the coil 142 of the release relay in circuit 137 is therefore open-circuited. Before proceeding further with a description of the circuit and its operation, it is to be emphasized that A and R circuit 137 is not to be confused with the circuit previously described in the electronic control operating unit of FIGURE 1 for operation during the "A and R" operating mode. The same is true for A and R circuit 136. These are completely separate and distinct circuits having different elements and different functions.

Returning now to a description of A and R circuit 137, with control winding 142 of the release relay non-energized, switch arm 144 and fixed contact 145 thereof are in their normally open position. These contact members are utilized to control the operation of a release magnet of the pneumatic control unit at the Y end of the car, as will further be described. At this point it is sufficient to note that with the contact members 144 and 145 open, no current is supplied to the release magnet on the pneumatic control valve at the Y end of the car for release of pressure in the brake lines.

Continuing with the assumption of zero voltage at terminal 140 of A and R circuit 137, a positive voltage is applied from terminal 147 via resistor 148 to the collector of NPN transistor 150 and at the same time a negative voltage is supplied from terminal 151 via resistors 152 and 153, such that the voltage exising at the junction 154 between resistors 148, 155 and collector of transistor 150, is zero. Under these conditions, transistor 158 is non-conductive and the control winding 163 of an application relay of A and R circuit 137 is non-energized.

As will be explained in greater detail in the ensuing description, with the release relay winding 142 de-energized, the normally open contact members 144 and 145 remain open such that the release magnet of the pneumatic control valve on the Y end of the car is de-energized, whereby pneumatic fluid pressure is prevented from passing from the brake cylinder supply pipe to the atmosphere. The same situation exists, of course, on the X and of the car for corresponding conditions existing in A and R circuit 136. While the application relay control winding 163 is non-energized, the normally closed contact members thereof supply voltage to the appropriate application magnet automatic control valve for energization thereof the block the supply of fluid under pressure to the brake cylinder at that end of the car. Again, a similar situation exists for the X end of the car under corresponding conditions existing for A and R circuit 136. This set of conditions (normal conditions), characterized by the existence of zero voltage at either or both amplifier 132 or 133 such that neither the release nor the application relay of the A and R circuit is energized (as distinct from energization of the release or application magnets), is known as the lap position for the respective end of the car.

Assume now that conditions existing at the fluid brake control equipment, in a manner to be explained later, produce a build-up of brake cylinder pressure at the Y end of the car. This pressure is sensed by pressure transducer 127 which reacts by movement of its potentiometer contactor or slider in an appropriate direction to provide a negative voltage at terminal 130. While the present discussion is concerned with conditions existing in the Y end of the car it will be realized from previous considerations that the same operation will subsist for corresponding conditions existing at the X end of the car, with appropriate substitution of equipment. The negative voltage appearing at terminal 130 is applied to the terminal of amplifier 133 and results in a positive voltage at terminal 140 of A and R circuit 137. This positive voltage is applied, via now forward-biased diode 170 and resistor 171, to the base electrode of NPN transistor 141, turning the latter on and thereby energizing the control winding 142 of the release relay for A and R circuit 137. In this manner, switch arm 144 of the release relay is pulled against contact member 145, so that energizing voltage is now applied to the winding of the release magnet at the Y end of the car. Energization of the release magnet results, in turn, in a release of pressure from the brake pipe or line for the brake cylinder, in a manner to be described, and thus in a return of the slider of feedback transducer 127 to a position resulting in a zero voltage at terminal 130 of resistance panel 107.

A subsequent loss of fluid pressure from the brake control unit at the Y end of the car during a brake application command results in an adjustment of the respective feedback transducer, the Y transducer 127 in this case, in a direction to provide a positive voltage sum at terminal 130, and therefore to the input terminal of amplifier 133. The resulting negative voltage at terminal 140 of circuit 137 is effective to render transistors 150 and 158 conductive whereby to energize control winding 163 of the application relay. Contact members 165 and 166 of the application relay (circuit 137) are thus opened, so that the application magnet at the Y end of the car is de-energized to permit replenishment of fluid pressure to the brake cylinder until the potentiometer slider of feedback transducer 127 returns to a position to establish or re-establish zero voltage at terminal 130.

An inshot control circuit 180 is employed to provide rapid application of fluid pressure (i.e., an inshot of brake cylinder pressure) to bring the brake shoes into contact with the braking surface, such as the tread of the vehicle wheels, at the initiation of a brake application. This renders the pneumatic brake units immediately responsive to the fading of dynamic brake thereby adding pneumatic brake forces to the total braking effort as dynamic brake fades. When the dynamic brake fades to zero, pneumatic brake is established at a value in which the feedback transducers 121 and 127 are adjusted to bring the potentials at terminals 115 and 130, respectively, to zero, thereby placing the brake equipment in the lap position.

To effect this inshot of fluid pressure to the brake units at either end of the car, the inshot control circuit 180 is supplied with brake control voltage from terminal 104 to an input terminal 182, and is further supplied with positive and negative bias voltages of equal value from terminals 110 and 185, respectively, to inshot control terminals 183 and 184. With the brake control signal voltage at terminal 104 at a predetermined negative value representative of full brake release (or propulsion) command on the car, NPN transistor 187 is non-conductive and a positive voltage is therefore supplied from positive bias terminal 110, inshot control terminal 183, and to resistors 190 and 191 to the base electrode of a second NPN transistor 189. When the brake control signal voltage is reduced from the aforementioned negative voltage representative of full brake release by a very slight predetermined value, as will occur at the initiation of a brake application command, transistor 187 is rendered conductive thereby forcing the potential at its collector electrode to approximately that at its emitter electrode. Under these conditions the negative bias voltage at inshot terminal 184 is supplied via resistor 191 to the base electrode of transistor 189, switching the latter from a conductive to a non-conductive condition. Accordingly, the low resistance path to ground is removed and the positive voltage existing at bias terminal 183, reduced by an amount equal to the voltage drop across resistor 192, provides a forward bias on diodes 195 and 196, and is applied to the resistors 197 and 198 leading to the input terminals of amplifiers 132 and 133, respectively. This low value of positive voltage at the input terminals of the two amplifiers undergoes amplification and polarity inversion by each amplifier and is applied to the respective A and R circuit with which the amplifier is associated.

In the case of A and R circuit 137, a negative voltage is applied to terminal 140, which as previously explained, results in the switching of the transistors 150 and 158 to the conductive state, and in consequence, in the energization of application relay winding 163. The same operation occurs for A and R circuit 136. Accordingly, the application magnet on the pneumatic control valve at each end of the car is energized to provide an inshot of fluid, accompanied by a rapid increase in brake cylinder pressure. This added fluid pressure in brake cylinders is effective to move the slider of each feedback transducer 121 and 127 to a respective position at which slight negative voltage appears at terminals 115 and 130 to compensate or overcome the slight positive voltage which is applied to the input terminals of amplifiers 132 and 133 by the inshot control circuit 180. In this manner, zero voltage is re-established at the input terminals of the respective amplifier and the pneumatic brake control portion is returned to the lap position.

In summary of the electronic control, in the P mode of operation, which is preferred for the control system of operation the A and R mode, any change in P wire current between the aforementioned predetermined limit and zero value is effective to produce a change of brake cylinder pressure of proportional value between zero p.s.i. and full service, with the full service brake cylinder pressure varying between a limit for empty car condition and a higher limit for full car loading. In addition, the dynamic brake effectiveness withholds the pneumatic brake control in an amount proportional to the extent of dynamic brake effort. All of these factors are present in the brake control signal applied to control conversion circuitry, which acts to modify the brake control signal to operate the appropriate apparatus in the pneumatic brake control portion of the braking system. The modified control signal maintains the pneumatic brake equipment in the lap position, with the conversion circuitry and feedback transducers operating to compensate for buildup of brake cylinder fluid pressure or loss of brake cylinder fluid pressure. The control conversion circuitry also includes an inshot control circuit which is utilized to establish inshot brake cylinder pressure upon initiation of brake application, to maintain the pneumatic brake immediately responsive to fading or failure of the dynamic brake.

Referring now to FIGURE 3, there is shown a diagram of the fluid brake control valving apparatus provided at each end of a car whose brakes are to be controlled, except that portion including the feed valve 247 which receives main reservoir pressure by way of a filter 249 and supplies the same to a check valve 250 via a pipe 221, the latter portion of the apparatus being common to both ends of the car. In other words, the main reservoir pressure is regulated by feed valve 247 and check valve 250 in order to govern supply pressure on the pneumatic brake units at either end of the car. In this respect it will be observed that one branch of pipe 202 from check valve 250 extends to the pneumatic brake equipment at the other end of the car, and that the same situation is true for pipe 221 which supplies feed valve pressure from feed valve 247 to various portions of the pneumatic brake control equipment at one end of the car and which has a branch extending to the pneumatic brake equipment at the other end of the car.

Other branches of pipe 202 lead to the supply reservoir, to the supply valve chamber of a relay valve 270 of the piston type, to a charging valve 251, and to the spool valve of an emergency valve 253. Charging valve 251 is employed for initially charging a quick action chamber 271 by way of a charging check valve 252, through pipes 202a and 204. Emergency valve 253 includes a housing receiving pipes 201, 202, 203, 204 and 221 and having within the housing a piston 261 which is movable between a pair of chambers 260 and 260a at either face of the piston. Upon supply of quick action pressure to chamber 260 from pipe 204, sufficient to overcome the pressure which may exist in the chamber 260a at the opposite face of the piston, piston 261 is forced to its emergency application position in which fluid, and hence supply reservoir pressure, is fed from pipe 202 to pipe 203. On the other hand, when the pressure in brake pipe 201 exceeds the quick action pressure in chamber 260 of emergency valve 253, piston 261 is forced to the opposite position by the build-up of pressure in chamber 260a, and thereby cuts off the flow of fluid between pipes 202 and 203 while at the same time opening a fluid passageway from the feed valve pipe 221 to quick action chamber pipe 204. In the latter manner the quick action chamber is charged at the same rate at which pressure is being built up in the brake pipe.

The piston 265 of relay valve 270 is spring-biased to a normal position in which pipe 216 is connected to an exhaust port to vent fluid pressure therefrom, and in this normal position fluid flow between pipe branch 202 and pipe 216 is cut off by a seated check valve 266. However, when sufficient fluid pressure is built up in the chamber 264 of the relay valve from pipe 204a to overcome this normal bias, the piston is forced into its application position unseating check valve 266 thereby establishing communication between pipes 202 and 216. The pressure in pipe 216 is fed back through a passage 216a to a pressure balancing chamber 264a, thereby reseating check valve 266 when the pressure established in pipe 216 corresponds to that established in piston chamber 264.

Feed valve pressure in pipe 221 is also supplied to application and release magnet portions 254 and 255, respectively, and to dump valve 256 and pilot valve 257. The pilot valve 257 is used for manual charging of brake pipe 201, the brake pipe being coupled to an emergency contractor 280, which may be a conventional pressure operated switch, operative to maintain an open connection between the P wire control circuit and the pneumatic brake control portion until the brake pipe 201 is charged to pressure sufficient for safe movement of the car. At that time, emergency contractor 280 is rendered operative to close the P wire circuit, for control of the brakes from the lead car. Brake pipe 201 is also coupled to emergency valve 253, as previously mentioned, and to an emergency brake valve 285 for effecting manual operation of pneumatic emergency brake application by selective venting of brake pipe pressure to the atmosphere.

Dump valve 256 comprises a piston valve normally spring biased to a position in which it establishes communication between pipe 216 and the brake cylinders of the brake unit. Energization of the solenoid valve, under control of a wheel slip control, causes pressure fluid to be supplied to the piston valve from the feed valve pipe 221 to actuate it to a position in which it releases fluid pressure from the brake cylinders only while wheel slip endures.

Application magnet valve 254 comprises a solenoid valve $S_A$ which is normally energized to supply fluid under pressure via pipe 221a to a chamber 254a whereby to shift piston valve PV of 254, against the bias exerted by spring 254b, to a close position in which supply is cut off from feed valve pipe 221 to pipe 211. On the other hand, release magnet valve 255 comprises a solenoid valve $S_R$ which is normally deenergized to vent fluid under pressure from chamber 255a whereby to shift piston valve PV of 255, under the force exerted by spring 255b, to a position closing exhaust from pipe 211. As will presently be discussed in greater detail, the application and release magnet valves 254 and 255 thereby provide a fail-safe feature in that should the electrical power fail, the brakes are automatically applied.

When emergency brake piston 261 is in its application position, supply reservoir pressure flows from pipe 202 to pipe 203, and thence via a double check valve 262 through pipe 208, by-pass valve 263, and pipe 204a to the chamber 264 of relay valve 270. As a result, the piston 264 is forced toward its application position such that fluid pressure flows from pipe 202 past unseated check valve 266 and on through pipe 216 and dump valve 256 to the brake cylinders of the brake unit. A variable load valve 269 is coupled in parallel with by-pass valve 263 through a branch of pipe 208 and a branch of pipe 204a, for reasons which will be explained presently.

Double check valve 262 has an alternate inlet to which fluid under pressure is supplied via a pipe 209, a service choke 273 and pipe 211 from the application magnet and release magnet portions 254 and 255, respectively.

In operation of the pneumatic brake control equipment of FIGURE 3, the brake pipe 201 is initially charged to a pressure value considered safe for movement of the car by operating the pilot valve on the lead car of a train to supply position and back to closed position. Before and during the charging of brake pipe 201, reservoir pressure supplied to charging valve 251 via pipe 202 is fed via a passageway 202a through check valve 252 to the quick action chamber 271 and via pipe 204 to the quick action pressure chamber 260 on one face of piston 261 of emergency valve 263. Since the brake pipe 201 is not yet charged, the pressure in chamber 260 is greater than that in chamber 260a at the opposite face of the piston, and therefore the piston is forced into its application position in which pipes 202 and 203 communicate via the spool valve of emergency valve 253.

The reservoir pressure thus supplied from pipe 202 to pipe 203 is fed through double check valve 262 to pipe 208, and thence through by-pass valve 263 to passageway or pipe 204a. This increases the pressure in chamber 264 of relay valve 270 to a value sufficient to overcome the normal spring bias on relay valve piston 265, and thus force the piston to its application position in which reservoir pressure is supplied via a branch of pipe 202 past unseated check valve 266 of the relay valve and on to pipe 216. When the pressure in balancing chamber 264a approximates the pressure in chamber 264, piston 265 shifts back to effect reseating of check valve 266. Thus the fluid pressure supplied to pipe 216 is established in accordance with the pressure established in chamber 264 of relay valve 270. Pipe 216 is coupled to the feedback transducer for the end of the car in question, and assuming the equipment shown in FIGURE 3 to be associated with the X end of the car, this is feedback transducer 121 of FIGURE 2. Pipe 216 is also coupled to the brake cylinders of the brake unit for this end of the car via dump valve 256. Accordingly, when pipe 216 is pressurized, as occurs for the sequence of operation discussed immediately above before and during pressurizing or charging of brake pipe 201, the pneumatic brakes are applied and will remain so until the brake pipe 201 is fully charged.

As previously indicated, charging of the brake pipe is initiated by the manual operation of pilot valve 257, which when depressed opens communication between feed valve pipe 221 and brake pipe 201, thus admitting feed valve fluid pressure to the brake pipe. As the pressure of fluid supplied to the brake pipe increases, there is a corresponding increase in pressure in chamber 260a of emergency valve 253. When the pressure in chamber 260a exceeds that exerted on the other face of the piston by the fluid in chamber 260, the piston 261 is forced toward the wall of chamber 260, thus blocking the passage of fluid from pipe 202 to pipe 203, while simultaneously opening a communication path between the feed valve pipe 221 and quick action chamber pipe 204. In this manner, the quick action chamber pressure is built up via the feed valve pipe at essentially the same rate as pressure is built up in brake pipe 201.

The aforementioned change of position of emergency valve piston 261 is effective to block the passage of fluid between pipes 202 and 203 and to connect pipe 203 to Exhaust to correspondingly reduce the pressure in pipe 216. When this change in position of piston 261 occurs, brake pipe 201 is charged to a pressure value safe for movement of the car. As previously mentioned, at this point emergency contactor or pressure switch 280 closes a circuit to permit control of the brakes from the lead car via the P wire circuit. At the same time, the fluid pressure in pipe 216 is completely vented to atmosphere to release the brakes which had been applied before and during charging of brake pipe 201.

It will, of course, be clear from a consideration of the apparatus diagrammatically shown in FIGURE 3 and from the preceding description that if the brake pipe pressure should for one reason or another undergo a reduction from the aforementioned pressure value at which emergency contactor 280 closes the control circuit and emergency valve piston 261 is forced away from its brake release position toward its brake application position, the emergency contactor is immediately rendered operative to again open the electronic control circuit and render the brake control divorced from any exercise of control at the lead car, until the brake pipe is recharged by manual operation of the pilot valve 257.

Simultaneously with such loss of brake pipe pressure, emergency valve piston 261 returns to its application position by reason of the quick action chamber pressure active in chamber 260 so that fluid pressure is again supplied from pipe 202 to pipe 203, resulting in an increase in pressure in pipe 216 and thus application of the brakes on the car under consideration and similarly on other cars of the train through which brake pipe 201 extends.

If, for example, a pneumatic emergency brake application is made in which emergency brake valve 285 is operated to vent the brake pipe pressure to the atmosphere, the quick action chamber pressure acting on emergency valve piston 261 will force the piston to a service position in which supply reservoir pressure is supplied from pipe 202 to pipe 203 past double check valve 262 and the by-pass valve 263 until inshot pressure to the brake cylinder has been established. Thereafter, the supply from pipe 208 to pipe 204a is maintained by way of the variable load valve 269 until sufficient brake cylinder pressure is established within the chamber of the variable load valve to overcome a normal spring bias and air spring pressure therein. Air spring pressure is varied according to the load on a car by a leveling valve in conventional manner. In this manner, the brake cylinder pressure is limited to a value sufficient to prevent wheel sliding under normal rail surface conditions.

Referring now to overall operation in general, with the electronic control switch 10 in the P mode position, the pneumatic brake control is effected in accordance with magnitude of current flow in the P wire extending from the lead car control station through each car whose brakes are to be controlled thereby. For a current in the P wire calling for full release or propulsion, e.g., 0.5 ampere, the electronic operating unit of FIGURE 1 supplies a brake control voltage at DBS terminal 104 to the electronic conversion system of FIGURE 2 of such magnitude and polarity as to maintain the application magnet valve 254 in its normally energized condition. Hence, fluid under pressure in feed valve pipe 221 is prevented from entering pipe 211 which leads to the pressure chamber 264 of relay valve 270 by way of service choke 273, pipe 209, and double check valve 262. If at that moment brake cylinder pressure as supplied by relay valve 270 exists in pipe 216, it is sensed by the appropriate feedback transducer, e.g., 121, which is operative to vary the position of the slider contact in accordance with the sensed pressure to modify the voltage supplied to the appropriate amplifier 132 or 133 of the conversion equipment. This results in energization of the release magnet valve 255 as previously described. Energization of release magnet valve 255 is effective to vent pressure from pipe 211 to the atmosphere through an exhaust choke 274. This, of course, will result in corresponding operation of relay valve 270 to effect a release of pressure from the brake cylinders of the brake unit and a consequent releasing of the brakes, at which time the release magnet valve 255 resumes its normally de-energized condition to close the exhaust communication. Any further leakage of fluid which might again establish brake cylinder pressure is again sensed by the feedback transducer to produce a control signal which ultimately results in venting the built-up pressure.

When a brake application is called for from the control station at the lead car, the current through the P wire is reduced by an amount proportional to the degree of braking desired, from the aforementioned current value of 0.5 ampere, for example. As previously noted, a zero current in the P wire produces full brake application since it results in discharge and ultimately zero voltage on capacitor 31, whereas values above zero current to a value of 0.5 ampere result in voltages on capacitor 31 producing proportional variation between full brake application and full release. The brake control signal voltage is modified in the electronic operating unit of FIGURE 1 in accordance with the degree of energization of dynamic brake and the extent of loading of the car, as described. As the dynamic braking fades in accordance with the reduction in speed of the car, the pneumatic brakes exercise a correspondingly increasing influence to provide the total braking function to bring the vehicle to a stop.

Upon initiation of the brake application signal, in terms of an appropriate brake control signal voltage at terminal 104 (FIGURES 1 and 2), the inshot control circuit operates in the described manner to produce an inshot of brake cylinder pressure, bringing the brake shoes into rapid but smooth contact with the braking surface or tread of the wheels. Accordingly, the pneumatic brake is rendered immediately responsive to fading of the dynamic brake, whereby to exercise a proportionally increased control as dynamic brake fades. When the dynamic brake fades to a zero value, the pneumatic brake is established at a value in which the feedback transducer responds to the fluid pressure to bring the brake equipment to the lap position, i.e., a condition in which zero voltage is applied to the input terminal of amplifiers 132 and/or 133.

In the lap position the release relay of the appropriate A and R circuit is de-energized such that the normally open contacts thereof are maintained in an open condition and the release magnet valve in the pneumatic brake control portion is correspondingly maintained de-energized to close the flow of pneumatic fluid pressure from the brake cylinder to the atmosphere. Similarly in the lap position, the application relay of the appropriate A and R circuit is also de-energized such that its normally closed contacts are maintained closed and the application magnet valve in the pneumatic brake control portion is energized to close the supply of fluid under pressure to the brake cylinder.

It will be observed from the foregoing description that the pneumatic brake is of the fail-safe type, that is to say, the release magnet valve is normally de-energized and the brake cylinder exhaust is therefore normally closed. The application magnet valve is normally maintained energized to prevent the supply of fluid under pressure to the brake cylinder. Failure of the electric supply will therefore result in application of the pneumatic brakes since the voltage bias on the application magnet via the normally closed application relay contact members is accordingly removed, de-energizing the application magnet to permit a supply of fluid under pressure to the brake cylinder.

A release of the service brakes is accomplished by increasing the current through the P wire, as previously explained. This increase in current results in a corresponding increase in the negative voltage applied as the brake control signal voltage from the electronic operating unit to the conversion equipment, and results in appropriate operation of the feedback transducer associated therewith to release the brakes on the car. That is, the increase in negative voltage supplied to the conversion equipment causes an energization of the release magnet in the aforementioned manner, and a consequent venting of the brake cylinder pressure to the atmosphere until the voltage supplied by the feedback transducer indicates that the brakes have been released by the desired amount.

Having now described our invention, what we claim as new and desire to secure by Letters Patent, is:

1. Apparatus for controlling a fluid pressure-operated braking unit of a vehicle, said apparatus comprising, in combination,
   a control station,
   a source of electrical energy of variable output for said control station, the electrical energy available from said source being selectively variable between predetermined limits in proportion to the desired degree of braking of said vehicle,
   a brake line capable of retaining fluid under pressure for application to said braking unit,
   means for supplying fluid under pressure to said brake line,
   means responsive to electrical signal deriving from the electrical energy selected for supply by said source for controlling said fluid pressure supply means to divert fluid under pressure to or from said brake line in accordance with the desired degree of braking, and means responsive to the pressure of fluid in said brake line for generating a further electrical signal representative thereof by which to modify the first-named electrical signal and thereby the control exercised by said controlling means to maintain said desired degree of braking.

2. The invention according to claim 1 wherein said vehicle additionally has a dynamic braking unit and said means for controlling includes means for varying said first-named electrical signal in accordance with the effectiveness of the dynamic brake to perform the degree of braking called for by the selected value of said electrical energy, so that said fluid-operated braking unit plays an increasing role in the braking of said vehicle as said dynamic brake fades.

3. The invention according to claim 2 wherein said controlling means further includes means for sensing the load on said vehicle and for further varying said first-named electrical signal in accordance therewith to vary the degree of braking called for as required by the extent of loading of said vehicle.

4. The invention according to claim 3 wherein said controlling means further includes an application magnet valve and a release magnet valve, said application magnet valve being normally energized to render said fluid pressure supply means inoperative, and responsive when deenergized to cause said supply means to supply fluid under pressure to said brake line, said release magnet valve being normally deenergized to block the venting of brake line pressure to the atmosphere, and responsive when energized to effect said venting.

5. The invention according to claim 4 wherein said application magnet valve and said release magnet valve are deenergized and energized, respectively, in accordance with the magnitude of said electrical signal to which said controlling means is responsive.

6. The invention according to claim 5 wherein said controlling means further includes means responsive to said first-named electrical signal dictating a fluid brake application for causing said fluid pressure supply means to supply a predetermined initial fluid pressure to said brake line, to render said fluid-operated braking unit substantially instantaneously responsive to braking signal in the event of fading of said dynamic brake.

7. The invention according to claim 6 wherein said means for generating further electrical signal in response to brake line fluid pressure includes a closed feedback loop, and a pressure-to-electric transducer connected in said feedback loop to supply said further electrical signal for modification of said first-named signal in an amount sufficient to compensate for overpressure and underpressure by commanding release and application of brake line pressure, respectively, via operation of said release and application magnet valves.

8. The invention according to claim 7 wherein said vehicle is one of a train of rapid transit cars, said control station located on one of said cars, said electrical energy being supplied to each car whose braking is to be controlled by a single wire, and means in each braking-controlled car for isolating said single wire from influence on said electrical energy carried thereby by conditions existing within the car and braking system thereof.

9. The invention according to claim 1 further including means for applying and releasing said fluid pressure operated braking unit independently of said electrical energy supplied by said source.

10. The invention according to claim 1 wherein said controlling means comprises a wire coupled to said source for passing current in an amount governed by the selected value of electrical energy supplied by said source, said current having a magnitude proportional to said value of electrical energy and ranging from zero magnitude, dictating full brake application, to a predetermined magnitude dictating full brake release, magnetic amplifier means responsive to current in said wire to produce an output current representative thereof, and for providing electrical isolation between said wire and the remainder of said controlling means, rectifier means responsive to the output current produced by said magnetic amplifier means for developing a primary brake control voltage representative thereof; and wherein is further provided means for modifying said primary brake control voltage to account for degree of braking by the dynamic brake of said vehicle and for loading of said vehicle.

11. Fluid pressure brake control apparatus for a vehicle having, in addition, a dynamic braking system, said apparatus comprising, in combination, a source of variable electrical energy, the magnitude of electrical energy deriving from which is selectively variable between predetermined values in proportion to the desired degree of braking of said vehicle from a value representative of full brake application to a value representative of full brake release, means responsive to the magnitude of electrical energy deriving from said source for developing an electrical signal proportional thereto, means responsive to the load on said vehicle and to the effectiveness of the dynamic brake to perform the desired degree of braking, for modifying a parameter of said electrical signal in accordance therewith to reflect the present values of load and dynamic braking in the braking control exerted by said signal, at least one fluid pressure-operated braking unit for said vehicle, means for supplying fluid under pressure to said braking unit, and means normally blocking the flow of fluid from said fluid supply means to said braking unit and the exhaust of pressure from said unit and responsive to said modified electrical signal for selectively causing the passage of said flow of fluid for signal representative of desired brake application and for venting pressure from said braking unit for signal representative of desired brake release.

12. The combination according to claim 11 wherein is further provided means responsive to pressure applied to said braking unit for further modifying said electrical signal to reflect the present value of said applied pressure in the braking control exerted by said signal.

13. The combination according to claim 12 wherein is further provided means responsive to said flow of fluid, to the load on said vehicle, and to the relative magnitude of pressure applied to said braking unit for limiting said flow of fluid to an extent sufficient to restrict the braking unit pressure to a value normally ineffective to produce wheel sliding accompanying the braking action.

14. The combination according to claim 13 wherein said braking unit includes a brake cylinder and a fluid retaining line coupled to said brake cylinder, and wherein said means for limiting flow of fluid comprises a variable load valve in said line, said valve normally biased to restrict fluid flow via said line.

15. Apparatus for controlling a fluid pressure-operated braking unit of a vehicle, said apparatus comprising, in combination, means for storing electrical energy, means for applying an amount of electrical energy to said storing means in accordance with the desired degree of braking control to be exercised on said braking unit, means for supplying fluid under pressure to said braking unit, means responsive to the amount of electrical energy stored by said storing means for controlling said fluid pressure supply means to divert fluid under pressure to or from said braking unit in accordance therewith, whereby to proportionally control the application or release brakes of said braking unit, means for sensing the fluid pressure on said braking unit and for generating an electrical signal representative thereof, and means for applying said signal to said controlling means to relax further control thereby upon attainment of said desired degree of braking.

16. The combination according to claim 15 wherein said electrical energy-applying means includes means for governing the time interval over which electrical energy is applied to said storing means.

17. The combination according to claim 15 wherein said electrical energy-applying means includes means for governing the magnitude of the electrical energy applied to said storing means.

18. A system for controlling a fluid vehicle braking unit, comprising a source of first electrical signal of magnitude variable between predetermined limits as a function of desired braking, to be exercised by said fluid braking unit, a brake line retaining fluid under pressure, control means responsive to said first electrical signal for directing fluid selectively from and to said brake line to vary called for fluid pressure in said brake line as a function of said desired braking as established by and in response to said first electrical signal, means responsive to pressure of said fluid in said brake line for generating a further electrical signal representative of actual pressure of fluid in said brake line, and means responsive to said further electrical signal for modifying said first electrical signal and thereby the action of said control means in such sense as to tend to maintain actual pressure of fluid in said brake line and thereby braking by said fluid braking unit equal to said desired braking.

References Cited

UNITED STATES PATENTS 3,382,012  5/1968  Lucien _______________ 303—21

DUANE A. REGER, Primary Examiner

U.S. Cl. X.R.

303—3, 22